US010743329B2

(12) United States Patent
Montojo et al.

(10) Patent No.: US 10,743,329 B2
(45) Date of Patent: Aug. 11, 2020

(54) HEARABILITY IMPROVEMENTS FOR INTERFERENCE MANAGEMENT SIGNALS

(71) Applicant: QUALCOMM Incorporated, San Diego, CA (US)

(72) Inventors: Juan Montojo, San Diego, CA (US); Farhad Meshkati, San Diego, CA (US); Yongbin Wei, La Jolla, CA (US); Taesang Yoo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 15/829,609

(22) Filed: Dec. 1, 2017

(65) Prior Publication Data

US 2018/0160437 A1 Jun. 7, 2018

Related U.S. Application Data

(60) Provisional application No. 62/430,650, filed on Dec. 6, 2016.

(51) Int. Cl.
*H04W 72/12* (2009.01)
*H04W 72/04* (2009.01)
*H04W 74/08* (2009.01)

(52) U.S. Cl.
CPC ....... *H04W 72/12* (2013.01); *H04W 72/0446* (2013.01); *H04W 72/0473* (2013.01); *H04W 74/0808* (2013.01)

(58) Field of Classification Search
CPC .............. H04W 72/04; H04W 72/042; H04W 72/0446; H04W 72/0453; H04W 72/0413;
(Continued)

(56) References Cited

U.S. PATENT DOCUMENTS

2011/0201283 A1* 8/2011 Lorenz ................. H04B 7/0617 455/78
2017/0223635 A1* 8/2017 Dinan ................. H04W 72/042
(Continued)

FOREIGN PATENT DOCUMENTS

WO WO-2016171813 A1 10/2016

OTHER PUBLICATIONS

Interdigital Communications: "NR Numerology", 3GPP Draft; R1-164666, 3rd Generation Partnership Project (3GPP), Mobile Competence Centre; 650, Route Des Lucioles; F-06921 Sophia-Anti Polis Cedex; France, vol. RAN WG1, No. Nanjing, China; May 14, 2016, XP051096361, Retrieved from the Internet: URL:http://www.3gpp.org/ftp/tsg_ran/WG1_RL1/TSGR1_85/Docs/ [retrieved on May 14, 2016], 5 pages.

(Continued)

Primary Examiner — Peter Chen
(74) Attorney, Agent, or Firm — Haynes and Boone, LLP

(57) ABSTRACT

Wireless communications systems and methods related to improving detectability of interference management signals are provided. A first wireless communication device communicates, with a second wireless communication device, a first reservation signal indicating a reservation for a first transmission slot in a spectrum accessed by a plurality of network operating entities. The first wireless communication device and the second wireless communication device are associated with a first network operating entity of a plurality of network operating entities. The first reservation signal includes a duration based on a power class associated with the first network operating entity. The first wireless communication device communicates, with the second wireless communication device, a first communication signal in the first transmission slot.

10 Claims, 14 Drawing Sheets

(58) Field of Classification Search
CPC ............. H04W 72/12; H04W 72/0473; H04W 74/006; H04W 74/0808; H04W 74/0816; H04W 74/0825; H04W 16/14; H04W 28/26

See application file for complete search history.

(56) References Cited

U.S. PATENT DOCUMENTS

| | | | |
|---|---|---|---|
| 2017/0230970 A1* | 8/2017 | Kim | H04W 28/26 |
| 2017/0251454 A1* | 8/2017 | Yang | H04B 7/26 |
| 2017/0294958 A1* | 10/2017 | Ahn | H04W 28/26 |
| 2018/0199374 A1* | 7/2018 | Ahn | H04W 28/26 |

OTHER PUBLICATIONS

International Search Report and Written Opinion—PCT/US2017/064470—ISA/EPO—dated Feb. 26, 2018.
LG Electronics: "Discussion on PUSCH Transmissions for MTC", 3GPP Draft; R1-155369, 3rd Generation Partnership Project (3GPP), Mobile Competence Centre; 650, Route Des Lucioles; F-06921 Sophia-Anti Polis Cedex; France, vol. RAN WG1, No. Malmo, Sweden; Oct. 4, 2015, XP051002278, Retrieved from the Internet: URL:http://www.3gpp.org/ftp/Meetings_3GPP_SYNC/RAN1/Docs/ [retrieved on Oct. 4, 2015], 3 pages.

* cited by examiner

HEARABILITY IMPROVEMENTS FOR INTERFERENCE MANAGEMENT SIGNALS

CROSS REFERENCE TO RELATED APPLICATIONS

The present application claims priority to and the benefit of the U.S. Provisional Patent Application No. 62/430,650, filed Dec. 6, 2016, which is hereby incorporated by reference in its entirety.

TECHNICAL FIELD

This application relates to wireless communication systems, and more particularly to improving hearability of interference management signals.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum-sharing (SS). In a priority-based coordinated access scheme, a spectrum is time-partitioned into multiple transmission opportunity (TXOP) intervals. Each TXOP interval includes a number of reservation indication slots followed by a transmission slot. Each reservation indication slot is assigned to a particular network operator for transmitting a reservation signal to reserve the transmission slot for communication. The reservation indication slots can be arranged in a decreasing order of priorities. When a low priority operator node detects a reservation signal from a high priority operator node, the lower priority operator node refrains from transmitting in the following transmission slot. When the high priority operator node is of a lower power class (e.g., lower transmit power) than the low priority operator node, the low priority operator node may not detect the reservation signal. Thus, the high priority operator node may proceed to reserve and transmit in the same transmission slot, causing noticeable interference to the transmission of the high priority operator node. Accordingly, improved procedures for sharing a spectrum among network operators of different power classes are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising communicating, by a first wireless communication device with a second wireless communication device in a spectrum accessed by a plurality of network operating entities, a first reservation signal indicating a reservation for a first transmission slot, wherein the first wireless communication device and the second wireless communication device are associated with a first network operating entity of a plurality of network operating entities, and wherein the first reservation signal includes a duration based on a power class associated with the first network operating entity; and communicating, by the first wireless communication device with the second wireless communication device, a first communication signal in the first transmission slot.

In an additional aspect of the disclosure, a method of wireless communication, comprising communicating, by a first wireless communication device with a second wireless communication device in a spectrum accessed by a plurality of network operating entities, a reservation signal indicating a reservation for a first transmission slot, wherein the first wireless communication device and the second wireless communication device are associated with a first network operating entity of a plurality of network operating entities; and communicating, by the first wireless communication device with the second wireless communication device, a communication signal in the first transmission slot, wherein the reservation signal includes a higher power spectral density (PSD) level than the communication signal.

In an additional aspect of the disclosure, an apparatus comprising one or more antennas; and a transceiver configured to communicate, via the one or more antennas with a second wireless communication device in a spectrum accessed by a plurality of network operating entities, a first reservation signal indicating a reservation for a first transmission slot, wherein the apparatus and the second wireless communication device are associated with a first network operating entity of a plurality of network operating entities, and wherein the first reservation signal includes a duration based on a power class associated with the first network operating entity; and communicate, via the one or more antennas with the second wireless communication device, a first communication signal in the first transmission slot.

In an additional aspect of the disclosure, an apparatus comprising one or more antennas; and a transceiver configured to communicate, via the one or more antennas with a second wireless communication device in a spectrum accessed by a plurality of network operating entities, a reservation signal indicating a reservation for a first transmission slot, wherein the apparatus and the second wireless communication device are associated with a first network operating entity of a plurality of network operating entities; and communicate, via the one or more antennas with the second wireless communication device, a communication signal in the first transmission slot, wherein the reservation signal includes a higher power spectral density (PSD) level than the communication signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
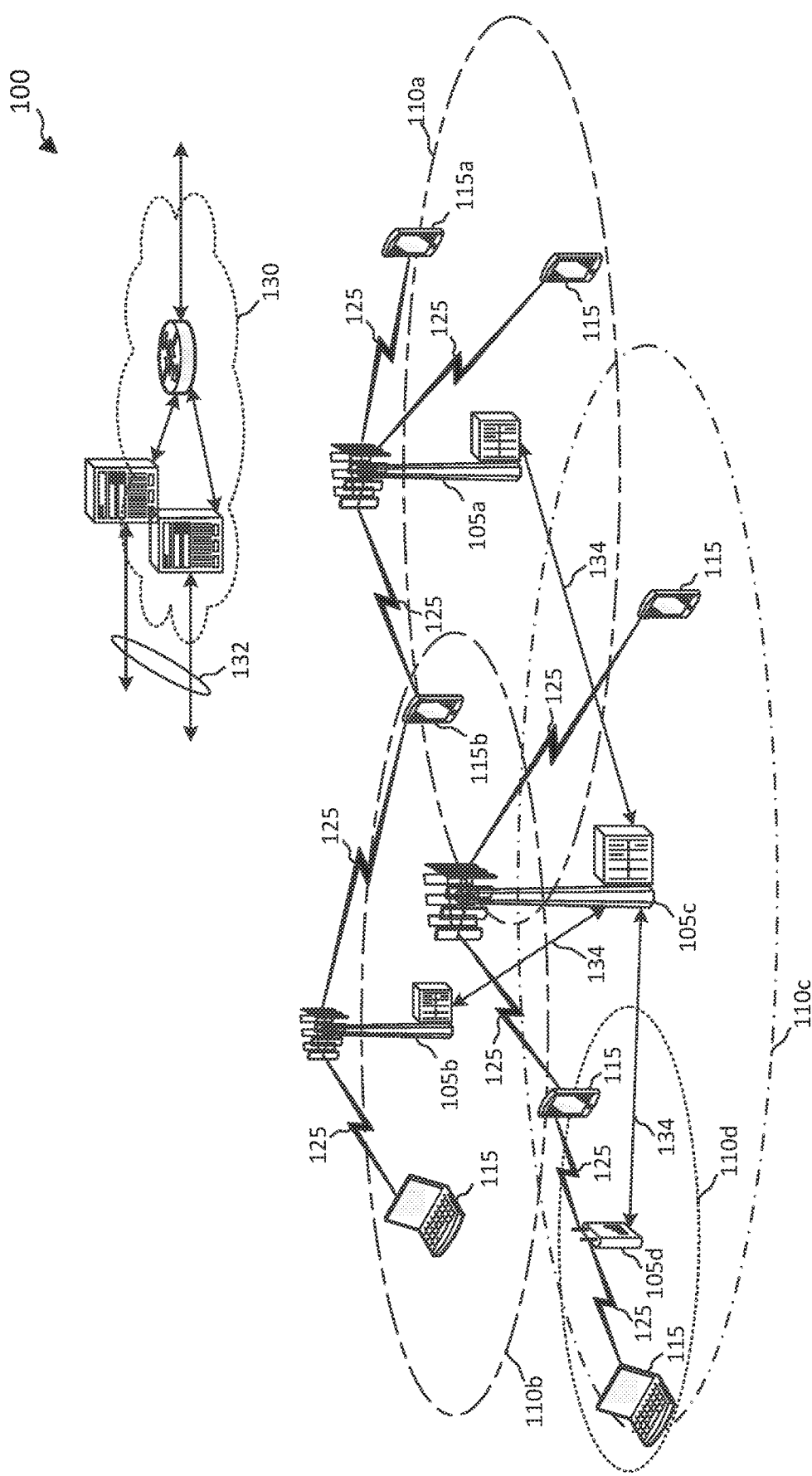
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWav bands) network.

The present disclosure describes interference management mechanisms for improving hearability or detectability of reservation signals for spectrum access. For example, a low-power network operating entity and a high-power entity operate in a priority-based access spectrum and employ an ordered coordinated access scheme based on reservations. In one embodiment, the low-power operator nodes can transmit reservation signals at a higher total power (e.g., at full transmit power), a higher PSD level, and/or with an extended duration to improve the hearability or detectability of the reservation signals at the high-power operator nodes. The PSD level can be increased by transmitting at the same power, but with a reduced bandwidth or with active frequency tones sparse in frequency. In one embodiment, high-power nodes can be configured with an increased receiver sensitivity that is compatible with the low-power nodes transmission power. The disclosed embodiments are suitable for use in coverage areas including macro cells (e.g., with high-power nodes) and small cells or pico cells (e.g., with low-power nodes). The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a spectrum. The spectrum may be unlicensed or partially licensed to one or more network operating entities. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operating entity. Wireless resources may be partitioned and arbitrated among the different network operating entities for coordinated communication between the network operating entities over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit a channel state information—reference signal (CSI-RS) to enable a UE 115 to estimate a DL channel Similarly, a UE 115 may transmit a sounding reference signal (SRS) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In an embodiment, a UE 115 attempting to access the network 100 may perform an initial cell search by detecting a primary synchronization signal (PSS) from a BS 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring.

In some embodiments, the UEs 115 and the BSs 105 may be operated by multiple network operators or network operating entities and may operate in a radio frequency spectrum, which may include licensed or unlicensed frequency bands. For example, in the network 100, the BS 105a and the UE 115a may be associated with one network operating entity, while the BS 105b and the UE 115b may be associated with another network operating entity. The spectrum may be partitioned into time intervals. Each time interval may be used by a particular network operating entity for communication based on assignments or negotiations (e.g., reservations), as described in greater detail herein.

To support coordinated access of the spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
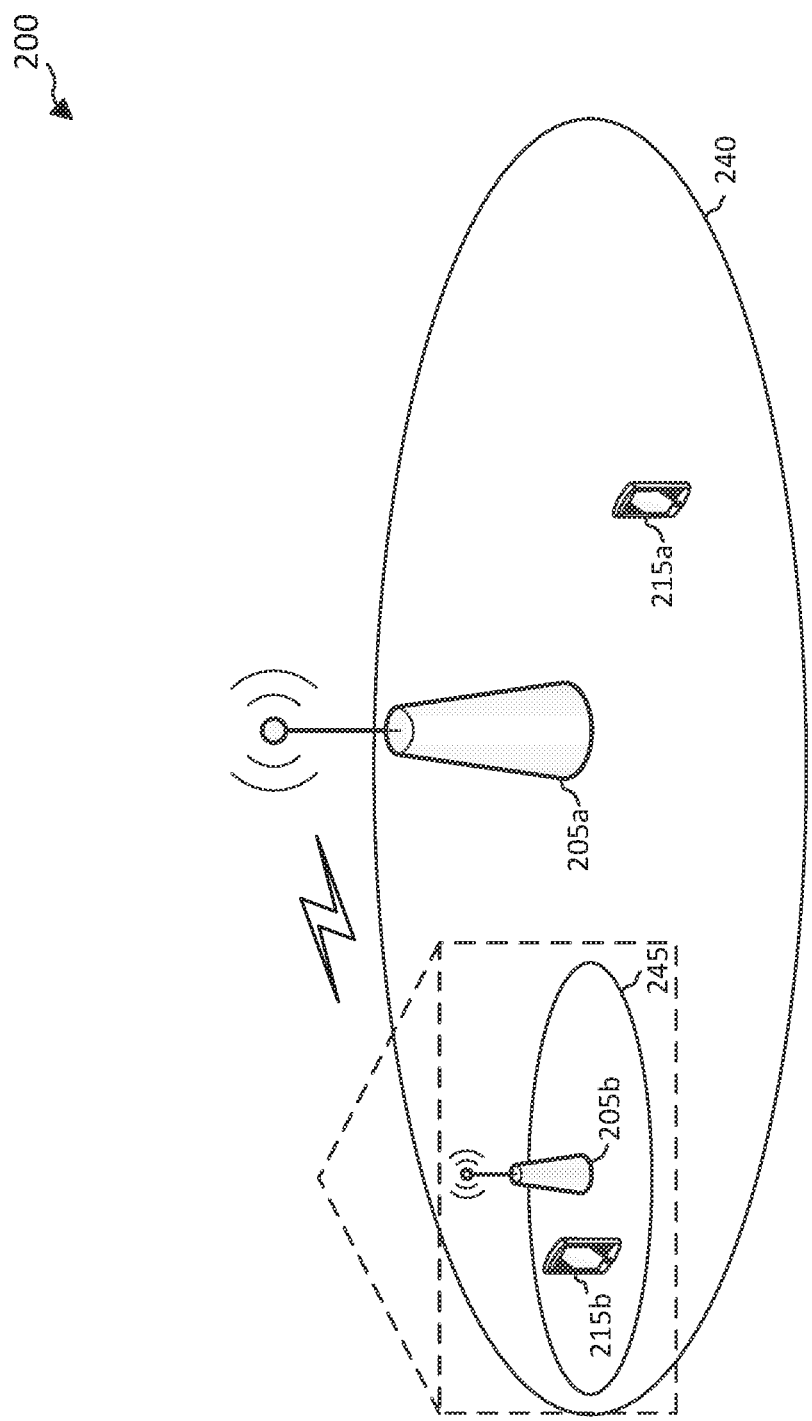
FIG. 2 illustrates an example of a wireless communications network including a macro cell and a pico cell accessing a spectrum according to embodiments of the present disclosure.

FIG. 2 illustrates an example of a wireless communications network 200 including a macro cell 240 and a pico cell 245 accessing a spectrum according to embodiments of the present disclosure. The network 200 may be similar to the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in the macro cell 240 and the BS 205b serves the UE 215b in the pico cell 245. As shown, the pico cell 245 is within a coverage area of the macro cell 240.

As described above, the geographic coverage area of a macro cell is relatively larger than a pico cell. As such, the pico BS 205b has a shorter transmission distance to reach the UE 215b than the macro BS 205a to reach the UE 215a. Thus, the pico BS 205b may transmit at a substantially lower power than the macro BS 205a. Similarly, the UE 215b may transmit at a substantially lower power to reach the BS 205b than the UE 215a to reach the BS 205a. One approach to sharing the spectrum between the high-power nodes (e.g., the BS 205a and the UE 215a) of the macro cell 240 and the lower-power nodes (e.g., the BS 205b and the UE 215b) of the pico cell 245 is to treat the macro cell 240 and the pico cell 245 as separate network operating entities and assign priorities to the macro cell 240 and the pico cell 245 for accessing the spectrum, for example, based on reservations, as described in greater detail herein.

Figure 3:
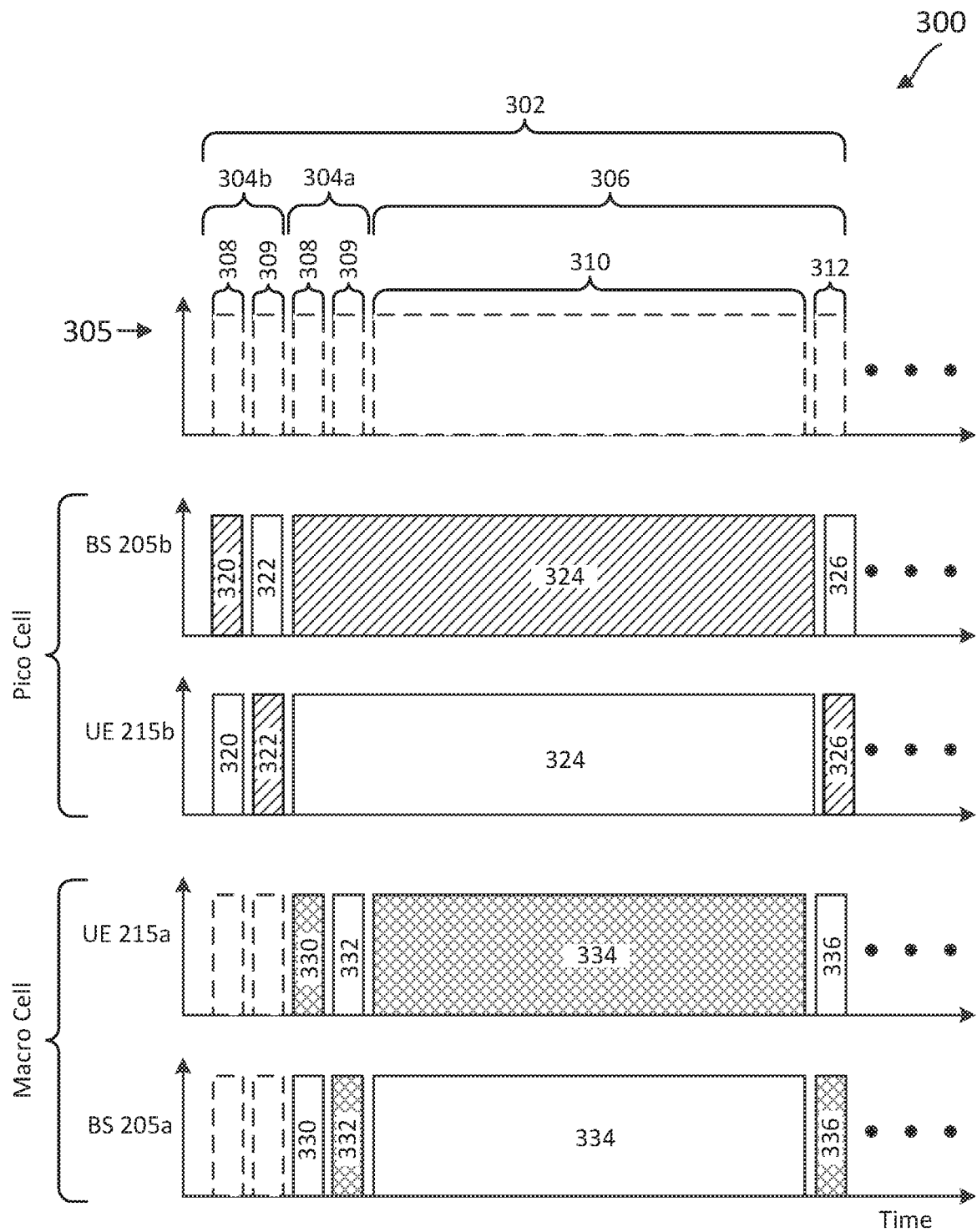
FIG. 3 illustrates an interference scenario between a high-power macro cell and a lower-power pico cell accessing a spectrum according to embodiments of the present disclosure.
Figure 4:
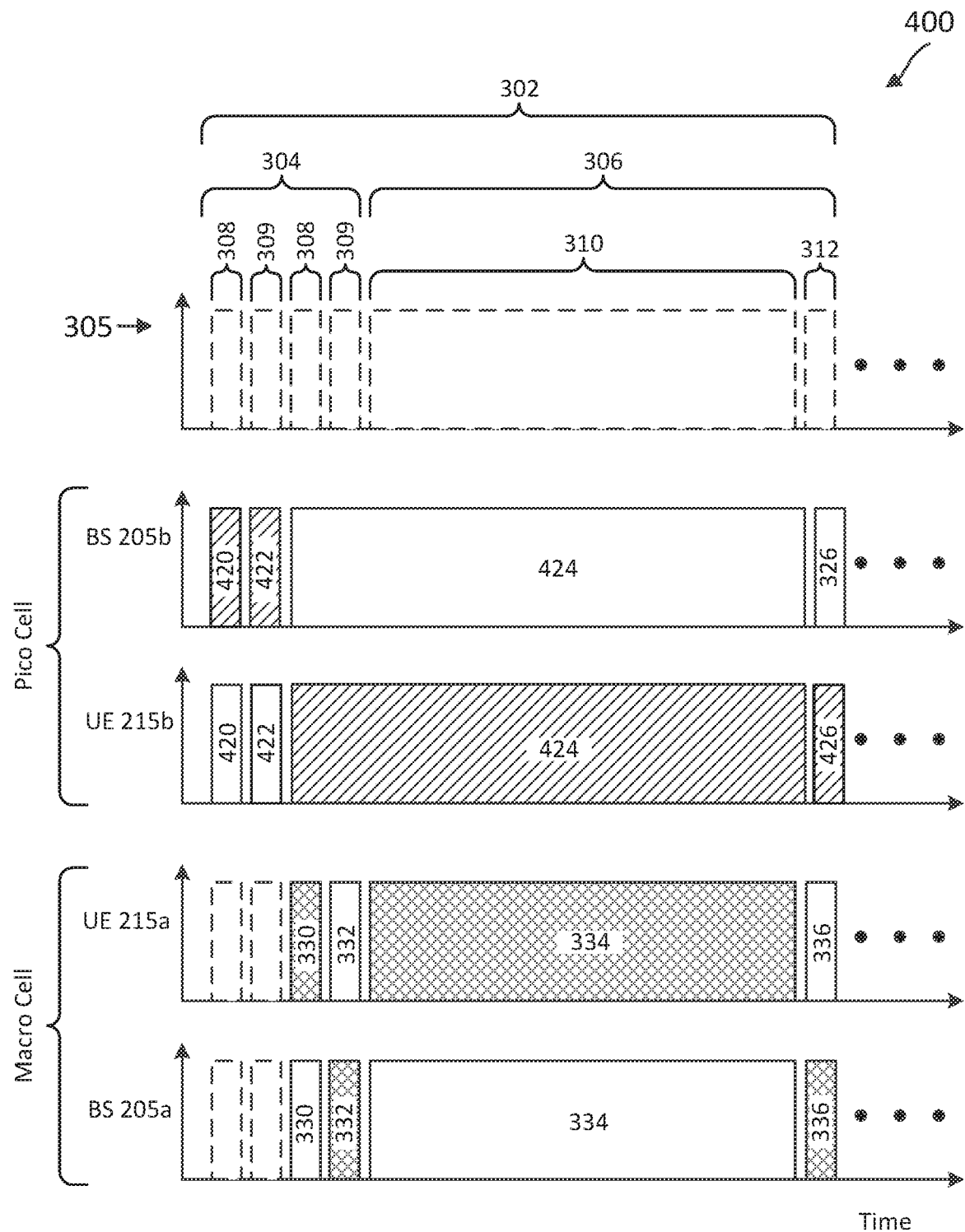
FIG. 4 illustrates an interference scenario between a high-power macro cell and a lower-power pico cell accessing a spectrum according to embodiments of the present disclosure.

However, the receiver sensitivity or noise figure (NF) requirements of the high-power macro nodes and the low-power pico nodes may be different due to the different transmit powers. For example, the high-power macro nodes may be configured for lower receiver sensitivity than the low-power pico nodes. Thus, the disparity of the transmit power levels and the receiver sensitivities of the macro BS 205a and the pico BS 205b can result in significant interference in the network 200 as shown in FIGS. 3 and 4. In FIGS. 3 and 4, the x-axes represent time in in some constant units. The patterned boxes represent transmitted signals. The solid boxes represent received signals. The dashed boxes represent no transmission or reception and are included in the illustration to show the underlying frame structure used for SS.

FIG. 3 illustrates an interference scenario 300 between the high-power macro cell 240 and the lower-power pico cell 245 accessing the spectrum according to embodiments of the present disclosure. The spectrum is time-partitioned into a plurality of transmit opportunity (TXOP) intervals 302 as shown in the frame structure 305. Each TXOP interval 302 includes a plurality of reservation indication slots 304 followed by a transmission slot 306. Each reservation indication slot 304 is assigned to a particular network operating entity (e.g., the pico cell 245 or the macro cell 240) for transmitting reservation signals to reserve the following transmission slot 306 for communications. Each reservation indication slot 304 is divided into two portions 308 and 309, for example, for transmitting a reservation request signal and a reservation response signal, respectively. The reservation indication slots 304 can be arranged in a decreasing order of priorities. Thus, a low priority operator node may yield channel (e.g., spectrum) access to a higher priority operator node. For example, a low priority operator node can listen to the channel during reservation indication slots 304 of higher priorities. Upon detection of a reservation from a higher priority operator node, the low priority operator node may refrain from transmitting in the following transmission slot 306. The transmission slot 306 can be used for UL and/or DL transmissions. For example, the transmission slot 306 includes two portions 310 and 312. The portion 310 can have a longer duration than the portion 312. For DL-centric communications, the portion 310 can be assigned for DL transmissions and the portion 312 can be assigned for UL transmissions. Alternatively, for UL-centric communications, both the portions 310 and 312 can be assigned for UL transmissions.

As an example, the high-priority reservation indication slot 304b is assigned to the pico cell 245 and the low-priority reservation indication slot 304a is assigned to the macro cell 240. The BS 205b transmits a reservation request signal 320 in the portion 308 of the reservation indication slot 304b to reserve the following transmission slot 306, for example, for a DL-centric transmission. In response, the UE 215b transmits a reservation response signal 322 in the portion 309 of the reservation indication slot 304b. The reservation request signal 320 can be pre-determine preambles or request-to-send (RTS) signals. The reservation response signal 322 can be pre-determined preambles or clear-to-send (CTS) signals. In some embodiments, the reservation request signal 320 can be a DL transmission trigger (e.g., a DL control signal carrying DL scheduling information) and the reservation response signal 322 can be a SRS. Subsequently, the BS 205b communicates with the UE 215b in the transmission slot 306. The transmission slot 306 may begin after the reservation indication slot 304b (e.g., occupying the low-priority reservation indication slot 304a). The BS 205b transmits a DL data signal 324, for example, based on the DL scheduling information, in the portion 310. The UE 215b transmits a UL control signal 326, for example, carrying scheduling request (SR) and hybrid automatic repeat request (HARQ) information. The DL signal 324 may carry DL data for the UE 215b.

Since the macro cell 240 has a lower priority than the pico cell 245, the BS 205a and the UE 215a may monitor the channel during the reservation indication slot 304b. As described above, the macro BS 205a may be a high-power node and the pico BS 205b may be a low-power node. As such, in some embodiments, the reservation request signal 320 and/or the reservation response signal 322 may be too weak (e.g. low signal strengths) to be detected by the BS 205a. Thus, the BS 205a may incorrectly determine that the transmission slot 306 is available and transmit a reservation request signal 330 in the portion 308 of the reservation indication slot 304a to reserve the transmission slot 306. Similarly, the reservation request signal 320 and/or the reservation response signal 322 may be too weak to be detected by the UE 215a. Thus, the UE 215a may respond to the reservation request signal 330 by transmitting a reservation response signal 332 in the portion 309 of the reservation indication slot 304a. Alternatively, the BS 205a may detect the reservation request signal 320 and/or the reservation response signal 322 with a signal strength sufficiently low (e.g., far away) and determine that a transmission from the BS 205a cannot cause significant interference. Thus, the BS 205a may also reserve the transmission slot 306. Subsequently, the BS 205a may transmit a DL data signal 334 and the UE 215a may transmit a UL control signal 336 in the transmission slot 306. As shown, the transmissions of the reservation request signal 330, the reservation response signal 332, and the DL data signal 334 of the macro cell 240 overlap in time with the transmissions of the DL signal 324 in the pico cell 245, and thus may cause significant interference to the DL signal 324. Similarly, the transmission of the UL control signal 336 overlap in time with the UL control signal 326, and thus may cause significant interference to the UL control signal 326.

FIG. 4 illustrates an interference scenario 400 between the high-power macro cell 240 and the lower-power pico cell 245 accessing the spectrum according to embodiments of the present disclosure. The scenario 400 is substantially similar to the scenario 300, but illustrates interference for a UL-centric transmission instead of a DL-centric transmission. As shown, the pico BS 205b transmits a reservation request signal 420 in the portion 308 and a reservation response signal 422 in the portion 309 to indicate a reservation for the following transmission slot 306. The reservation request signal 420 can be a UL transmission trigger, for example, a UL control signal carrying UL scheduling information. The reservation response signal 422 can be a CSI-RS. Subsequently, the UE 215b transmits a UL signal 424 in the portion 310 of the transmission slot 306, for example, based on the UL scheduling information and a UL control signal 426 in the portion 312 of the transmission slot 306. Similar to the scenario 300, the BS 205a and the UE 215a may not detect the reservation request signal 420 and/or the reservation response signal 422 and proceed to reserve and communicate in the transmission slot 306, causing significant interference to the transmissions of the BS 205b and the UE 215b similar to the scenario 300.

Figure 5:
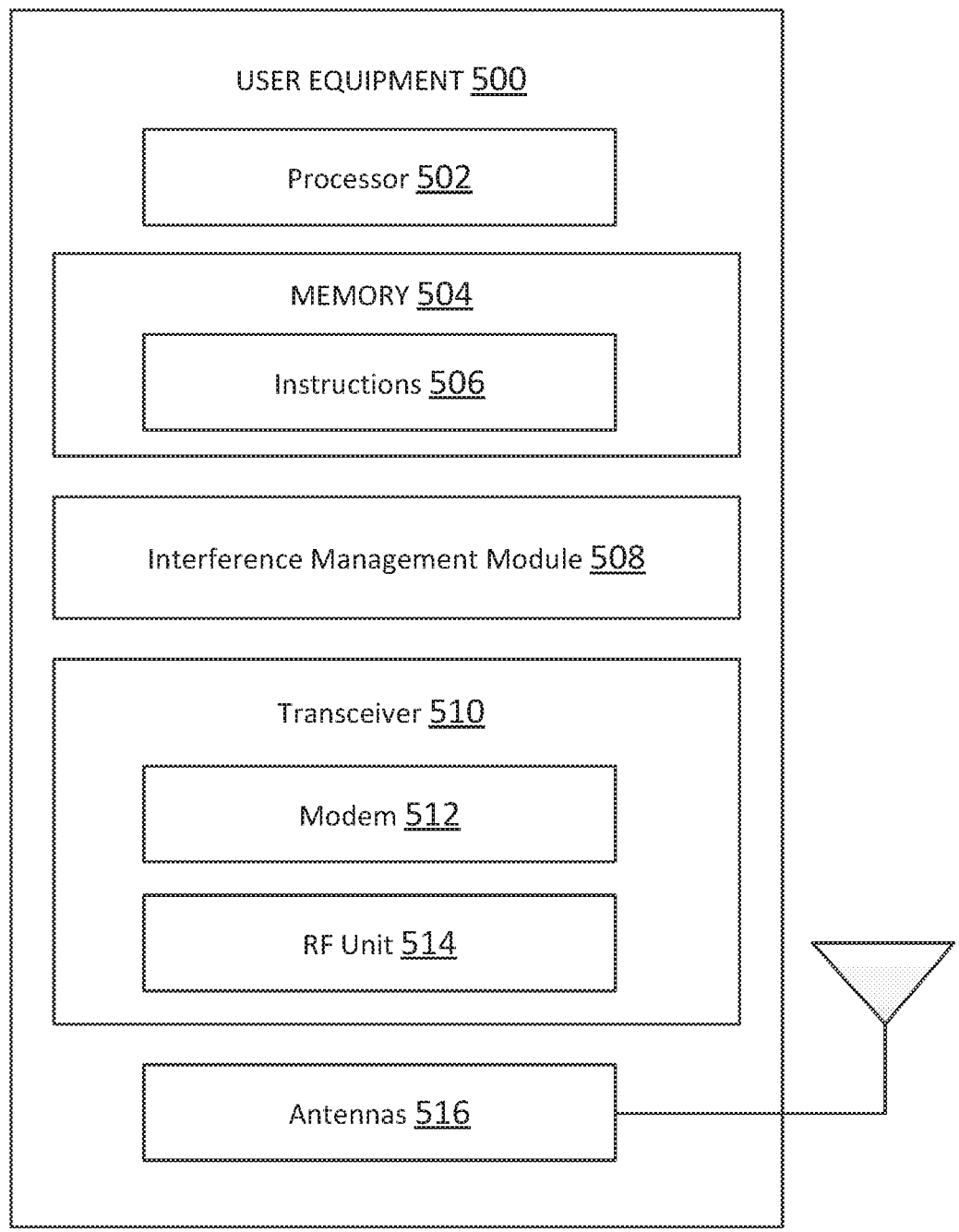
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 or 215 as discussed above. As shown, the UE 500 may include a processor 502, a memory 504, an interference management module 508, a transceiver 510 including a modem subsystem 512 and a radio frequency (RF) unit 514, and an antenna 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The interference management module 508 may be implemented via hardware, software, or combinations thereof. For example, the interference management module 508 may be implemented as a processor, circuit, and/or instructions 506 stored in the memory 504 and executed by the processor 502. The interference management module 508 may be used for various aspects of the present disclosure. For example, the interference management module 508 is configured to identify transmission opportunities in a spectrum, perform network listening, reserve time intervals in a spectrum, adjusting transmit power levels and/or durations, and/or receiver sensitivity to facilitate priority-based spectrum access by network operating entities of different power classes, as described in greater detail herein.

As shown, the transceiver 510 may include the modem subsystem 512 and the RF unit 514. The transceiver 510 can be configured to communicate bi-directionally with other devices, such as the BSs 105 and 205. The modem subsystem 512 may be configured to modulate and/or encode the data from the memory 504 and/or the interference management module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215 or a BS 205. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of clear-to-send (CTS) signals according to embodiments of the present disclosure. The antenna 516 may further receive data messages transmitted from other devices. This may include, for example, reception of request-to-send (RTS) and/or CTS signals according to embodiments of the present disclosure. The antenna 516 may provide the received data messages for processing and/or demodulation at the transceiver 510. Although FIG. 5 illustrates antenna 516 as a single antenna, antenna 516 may include multiple antennas of similar or different designs in order to sustain multiple transmission links. The RF unit 514 may configure the antenna 516.

Figure 6:
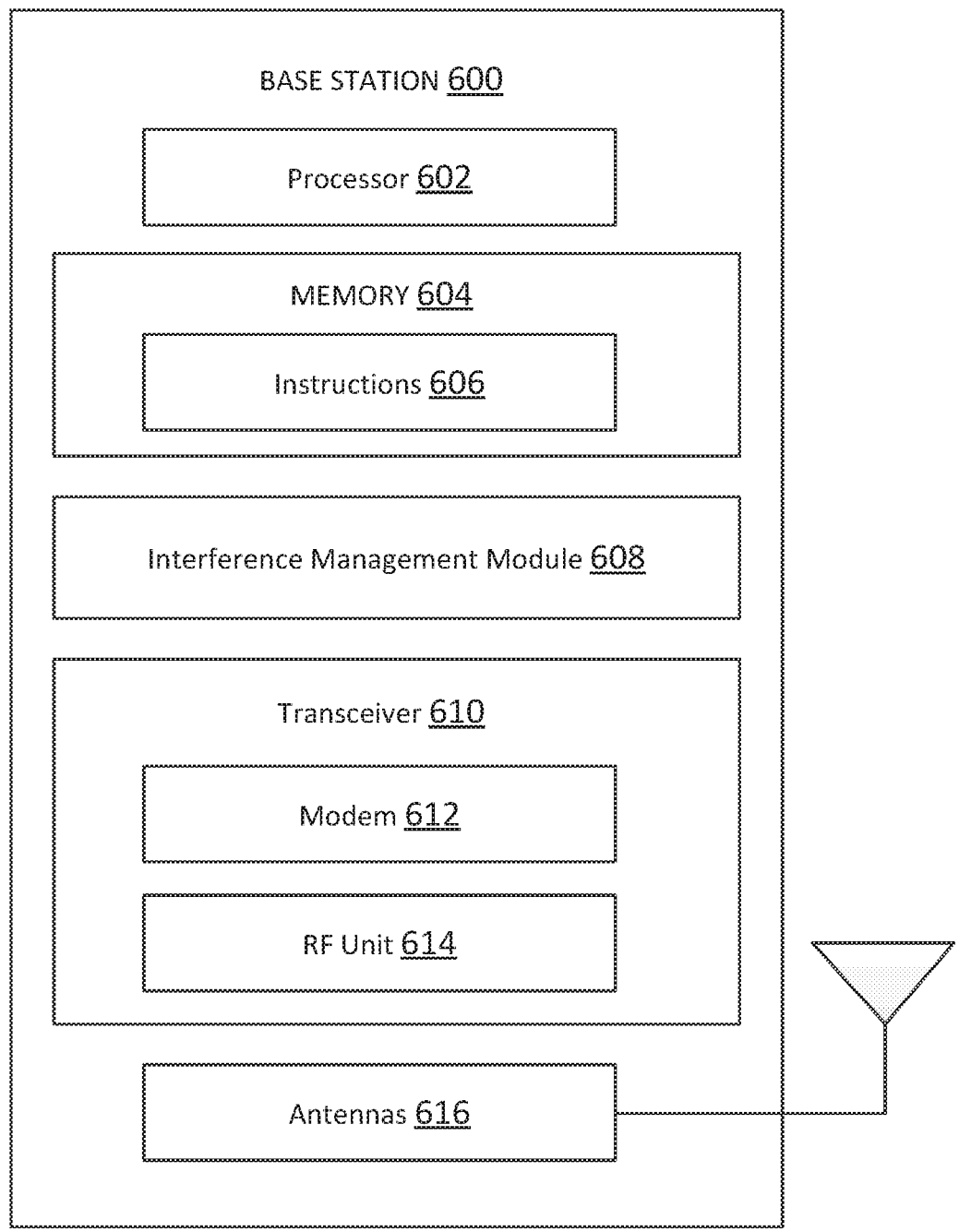
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 or 205 as discussed above. A shown, the BS 600 may include a processor 602, a memory 604, an interference management module 608, a transceiver 610 including a modem subsystem 612 and a RF unit 614, and an antenna 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The interference management module 608 may be implemented via hardware, software, or combinations thereof. For example, the interference management module 608 may be implemented as a processor, circuit, and/or instructions 606 stored in the memory 604 and executed by the processor 602. The interference management module 608 may be used for various aspects of the present disclosure. For example, the interference management module 608 may identify transmission opportunities in a spectrum, perform network listening, reserve time intervals in a spectrum, adjusting transmit power levels and/or durations, and/or receiver sensitivity to facilitate priority-based spectrum access by network operating entities of different power classes reclaim unused resources, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 205 to enable the BS 205 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of information to complete attachment to a network and communication with a camped UE 215 according to embodiments of the present disclosure. The antenna 616 may further receive data messages transmitted from other devices and provide the received data messages for processing and/or demodulation at the transceiver 610. Although FIG. 6 illustrates antenna 616 as a single antenna, antenna 616 may include multiple antennas of similar or different designs in order to sustain multiple transmission links.

Figure 7:
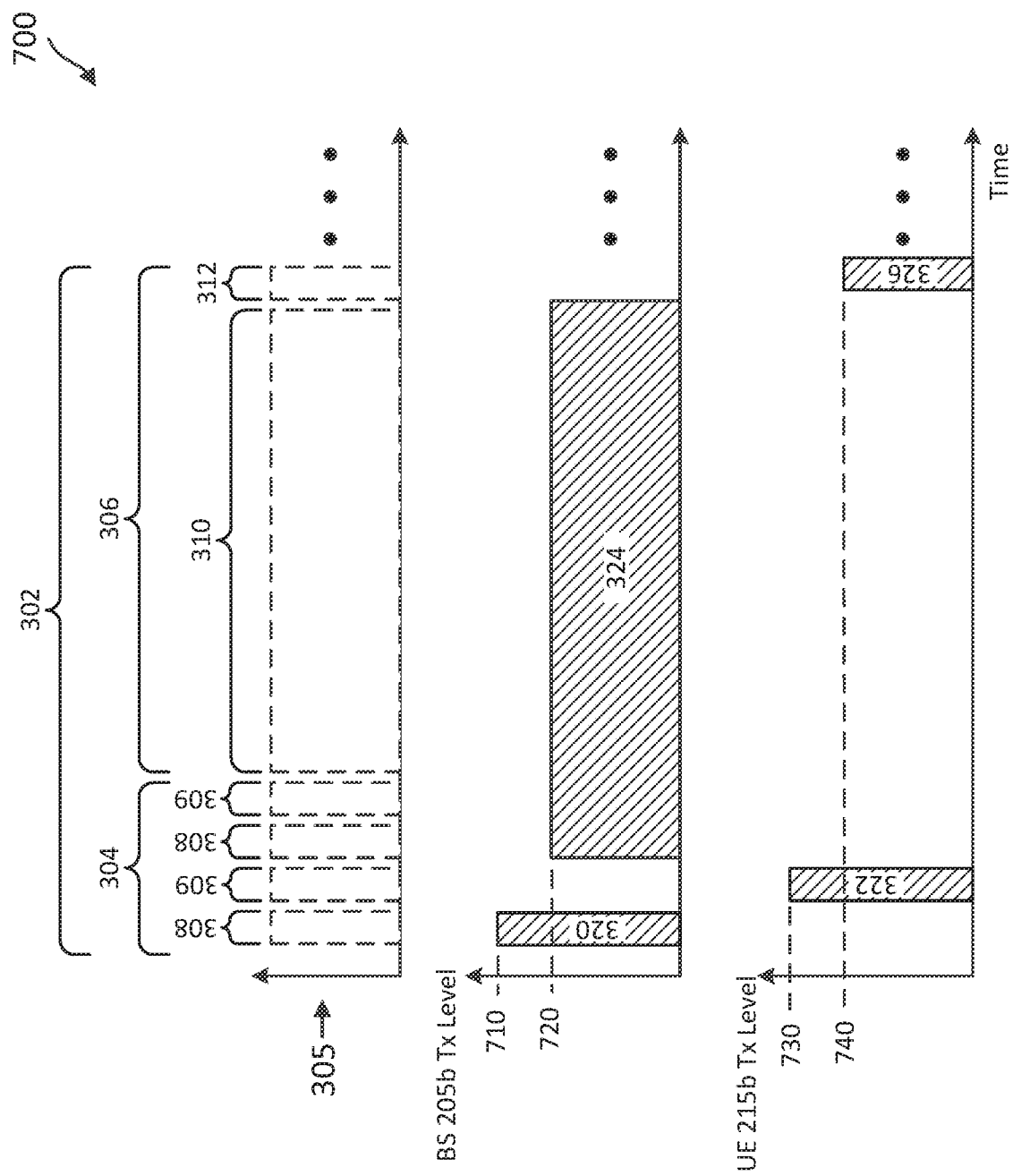
FIG. 7 illustrates a pico cell transmission scheme with improved reservation signal detectability according to embodiments of the present disclosure.

FIG. 7 illustrates a pico cell transmission scheme 700 with improved reservation signal detectability according to embodiments of the present disclosure. The scheme 700 can be employed by the pico BS 205b and the UE 215b. In FIG. 7, the x-axes represent time in some constant units and the y-axes represent transmit levels in units of voltages. The scheme 700 is based on the same frame structure 305. The BS 205b and the UE 215b may employ similar mechanisms to reserve and communicate in the transmission slot 306 as in the scenario 300. However, the BS 205b transmits the reservation request signals 320 at a higher power level than the DL signal 324. For example, the BS 205b transmits the DL signal 324 at a nominal transmit power level 720 and transmit the reservation request signal 320 at a full power level 710. Similarly, the UE 215b transmits the reservation response signal 322 at a higher power level than the UL signal 326. For example, the UE 215b transmits the UL signal 326 at a nominal transmit power level 740 and the reservation response signal 322 at a full power level 730. By increasing the transmit power of the reservation request signal 320 and the reservation response signal 322 from the pico cell 245, the hearbility or the detectability of the reservation request signal 320 and the reservation response signal 322 at the macro cell 240 can be improved. Although the scheme 700 is illustrated in the context of a DL-centric communication, the scheme 700 can be applied to a UL-centric communication.

Figure 8:
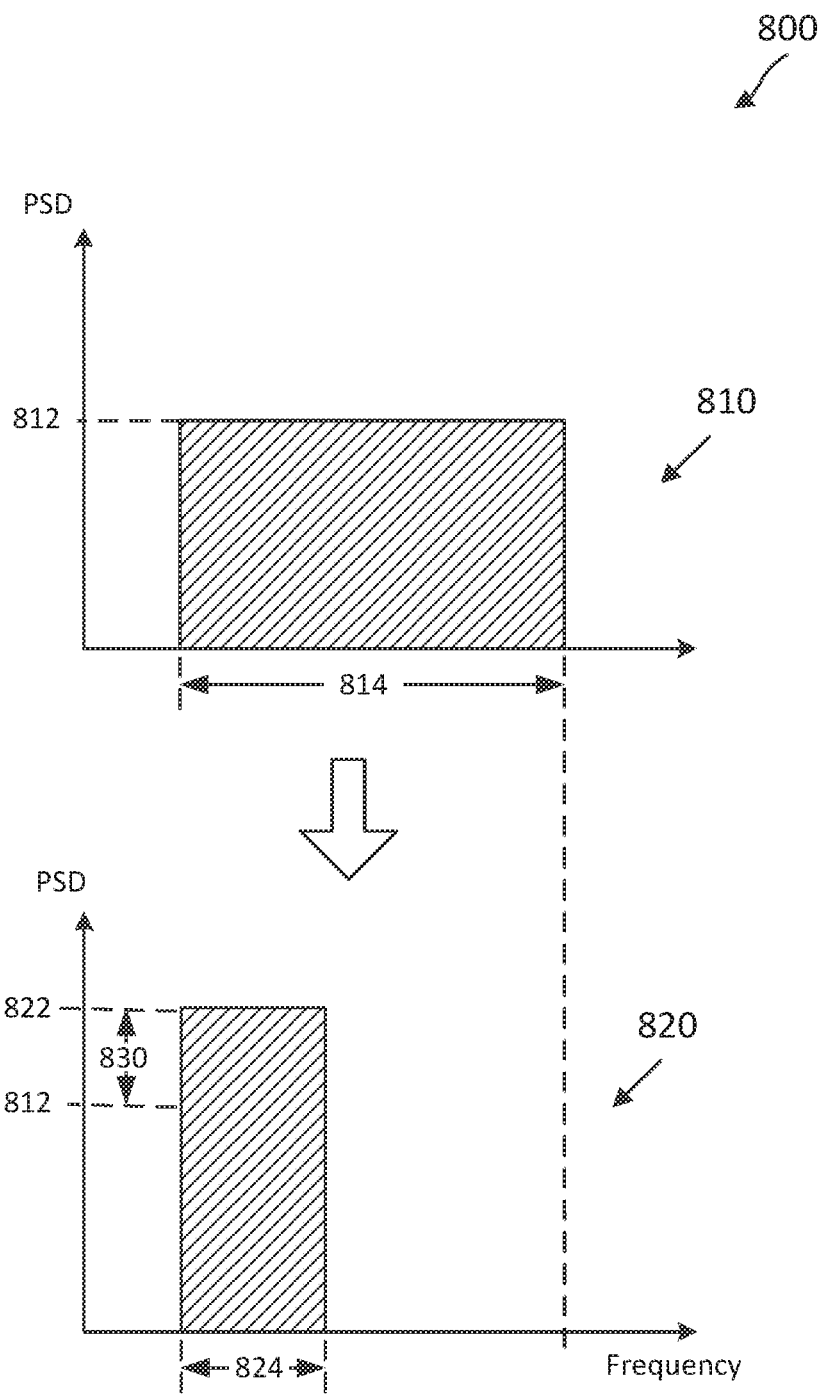
FIG. 8 illustrates a pico cell transmission scheme with improved reservation signal detectability according to embodiments of the present disclosure.

FIG. 8 illustrates a pico cell transmission scheme 800 with improved reservation signal detectability according to embodiments of the present disclosure. The scheme 800 can be employed by the pico BS 205b and the UE 215b. In FIG. 8, the x-axes represent frequency in units of hertz (Hz) and the y-axes represent power spectral density (PSD) in units of decibel-milliwatts per hertz (dBm/Hz). The scheme 800 is based on the same frame structure 305. The BS 205b and the UE 215b may employ similar mechanisms to reserve and transmit in the transmission slot 306 as in the scenarios 300 and 400. However, the BS 205b and the UE 215b transmit reservation signals (e.g., the signals 320, 322, 420, and 422) at an increased PSD level 822.

In FIG. 8, the graph 810 shows a frequency spectrum of a reservation signal (e.g., the reservation request signal 320 or the reservation response signal 322) transmitted at a nominal PSD level 812. The graph 820 shows a frequency spectrum of a reservation signal (e.g., the reservation request signal 320 or the reservation response signal 322) transmitted at an increased PSD level 812 by reducing the bandwidth of the reservation signal from a bandwidth 814 to a bandwidth 824. By reducing the bandwidth of the reservation signal, the PSD level of the reservation signal can be increased without increasing the total transmit power. The increased PSD level can improve the hearability or the detectability of the reservation signal. For example, when the bandwidth 824 is about half the width of the bandwidth 814, the PSD level can be increased by about 3 decibels (dB) as shown by 830.

Figure 9:
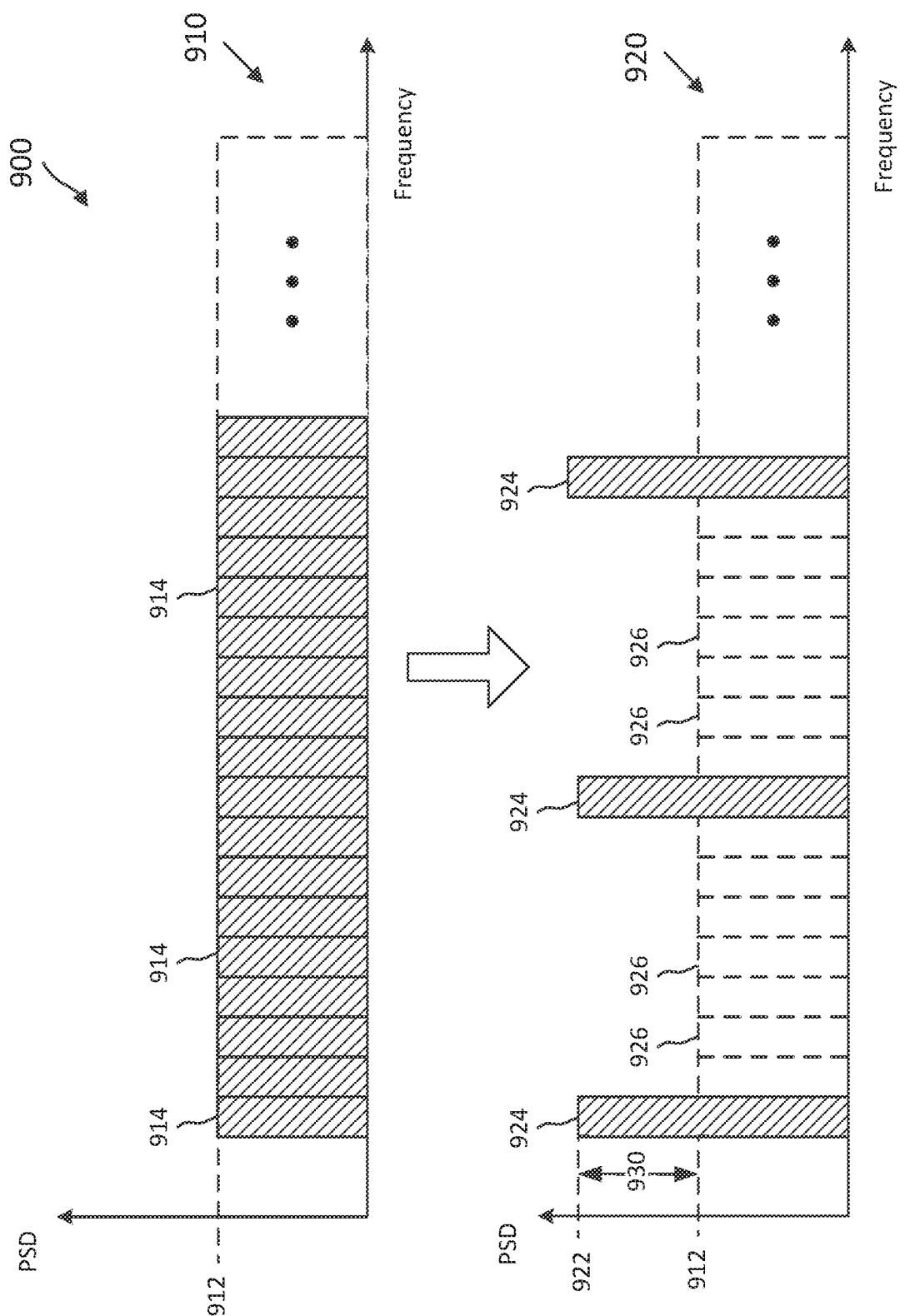
FIG. 9 illustrates a pico cell transmission scheme with improved reservation signal detectability according to embodiments of the present disclosure.

FIG. 9 illustrates a pico cell transmission scheme 900 with improved reservation signal detectability according to embodiments of the present disclosure. The scheme 900 can be employed by the pico BS 205b and the UE 215b. In FIG. 9, the x-axes represent frequency in units of Hz and the y-axes represent PSD in units of dBm/Hz. The scheme 900 is based on the same frame structure 305. The BS 205b and the UE 215b may employ similar mechanisms to reserve and transmit in the transmission slot 306 as in the scenarios 300 and 400. However, the BS 205b and the UE 215b transmit reservation signals (e.g., the signals 320, 322, 420, and 422) at an increased PSD level 922.

In FIG. 9, the graph 910 shows a frequency spectrum of a reservation signal (e.g., the reservation request signal 320 or the reservation response signal 322) transmitted at a nominal PSD level 912 with consecutive active frequency tones 914. The graph 920 shows a frequency spectrum of a reservation signal (e.g., the reservation request signal 320 or the reservation response signal 322) transmitted at an increased PSD level 922 by including active frequency tones 924 sparse in frequency (e.g., skipping transmission at some frequency). As shown, the active frequency tones 924 are spaced apart by a number of inactive tones 926. By reducing the number of active tones in the reservation signal, the PSD level of the reservation signal can be increased without increasing the total transmit power. The increased PSD level can improve the hearability or the detectability of the reservation signal. For example, when using one active frequency tone 924 in every 8 frequency tones, the PSD level can be increased by about 9 dB as shown by 930.

Figure 10:
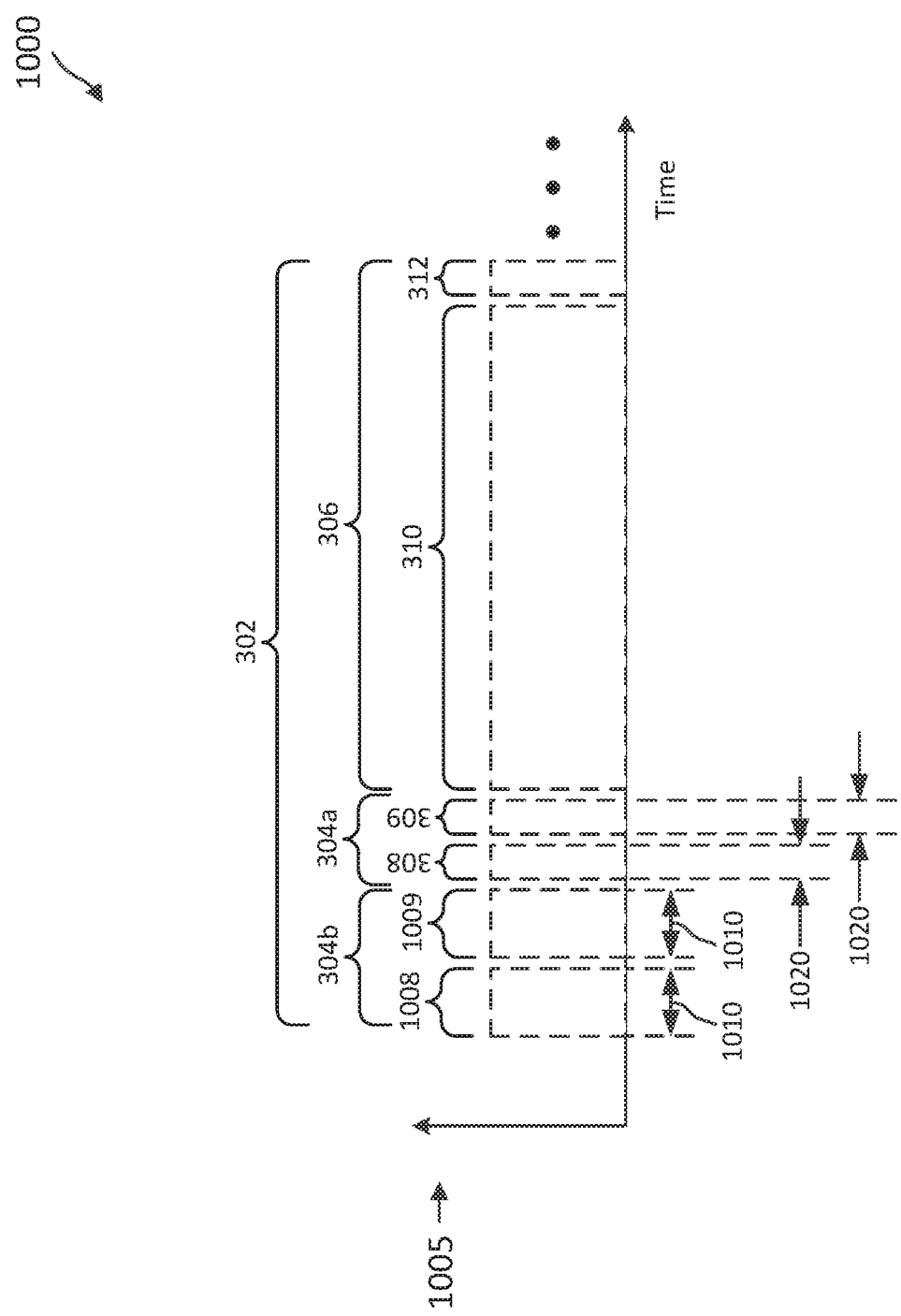
FIG. 10 illustrates a pico cell transmission scheme with improved reservation signal detectability according to embodiments of the present disclosure.

FIG. 10 illustrates a pico cell transmission scheme 1000 with improved reservation signal detectability according to embodiments of the present disclosure. The scheme 1000 can be employed by the pico BS 205b and the UE 215b. In FIG. 10, the x-axis represents time in some constant units. The scheme 1000 includes a frame structure 1005 similar to the frame structure 305. The BS 205b and the UE 215b may employ similar mechanisms to reserve and transmit in the transmission slot 306 as in the scenarios 300 and 400. However, the reservation indication slot 304b allocated to the pico cell 245 is extended in time. As shown, the portions 1008 and 1009 of the reservation indication slot 304b allocated to the pico cell 245 have longer durations than the portions 308 and 309 of the reservation indication slot 304a allocated to the macro cell 240 as shown by the durations 1010 and 1020. For example, the duration 1010 is about two symbols long, whereas the duration 1020 is about one symbol in length. The longer time span enables a receiver (e.g., at the macro BS 205a and the UE 215a) to perform energy combining to improve the hearability or the detectability of a reservation signal from the pico cell 240. For example, when the duration 1010 is doubled, the signal-to-noise ratio (SNR) can be increased by about 3 dB.

Figure 11:
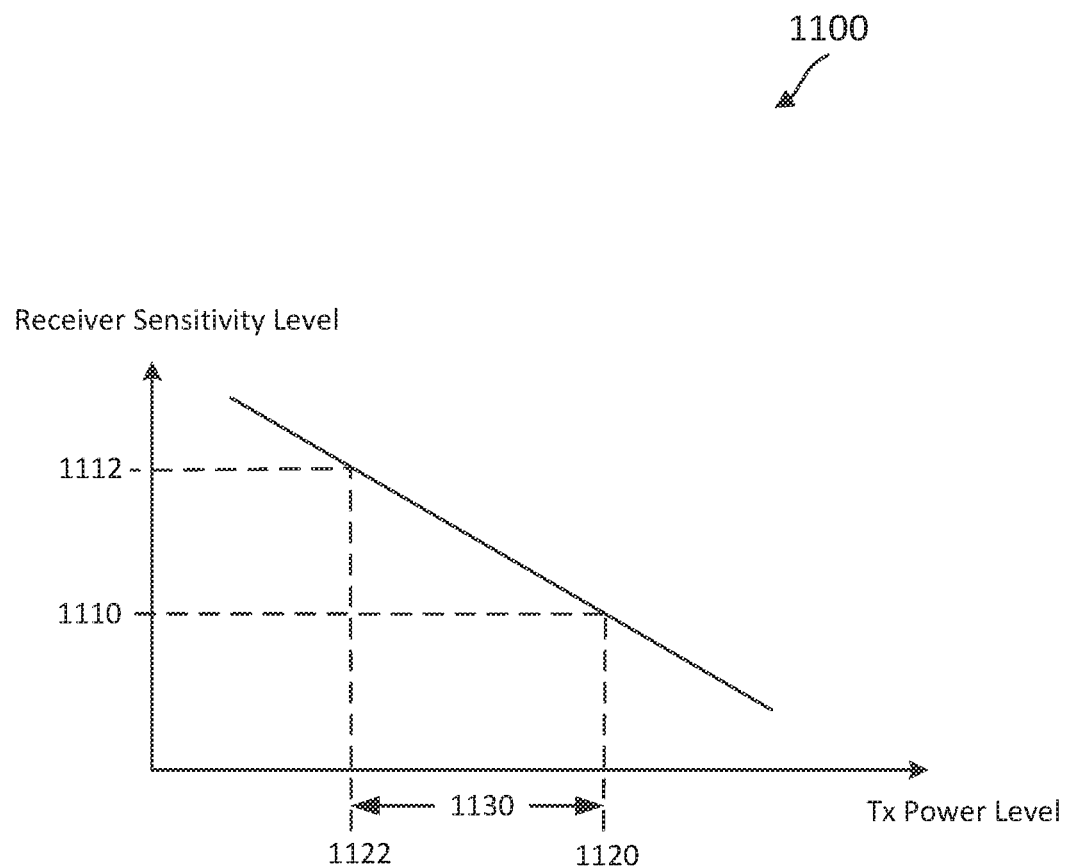
FIG. 11 illustrates a macro cell receiver configuration scheme with improved reservation signal detectability according to embodiments of the present disclosure.

FIG. 11 illustrates a macro cell receiver configuration scheme 1100 with improved reservation signal detectability according to embodiments of the present disclosure. The scheme 1100 can be employed by the macro BS 205a and the UE 215a. In FIG. 11, the x-axis represents transmit power levels in units of dBm, and the y-axis represents receiver sensitivity levels. Receiver sensitivity is a measure of the capability of a receiver to demodulate and decode information from a received signal. For example, receiver sensitivity can be specified for a quadrature phase-shift keying (QPSK) signal with a certain received error probability (e.g., a bit-error-ratio (BER)). In the scheme 1100, a macro node (e.g., the BS 205a and the UE 215a) can be configured to increase the receiver sensitivity level such that the macro node can improve the detectability of reservation signals (e.g., the reservation request signal 320 and the reservation response signal 322) transmitted by a pico node (e.g., the BS 205b and the UE 215).

As an example, a macro BS (e.g., the BS 205*a*) may be configured with a receiver sensitivity at a level 1110 sufficient for receiving reservation and/or communication signals transmitted by a macro UE (e.g., the UE 215*a*) at a transmit power level 1120. As described above, pico nodes are low-power nodes. For example, a pico node may transmit at a transmit power level 1122, which may be lower than the level 1120 by about 16 dB to about 23 dB as shown by 1130. Thus, in order to detect reservation signals transmitted by a pico node, the receiver sensitivity of a macro node is required to increase to close the power difference gap in conjunction with other techniques presented before. In some embodiments, the receiver sensitivity of a macro node can be improved based on hardware and/or or software design. For example, the receiver hardware can be designed to have a lower noise floor and the software can include more advanced DSP algorithms to detect and decode received signals. Although the scheme 1100 shows that the receiver sensitivity is configured as a linear function of the transmit power level, the receiver sensitivity can be configured as any suitable function of the transmit power level.

Figure 12:
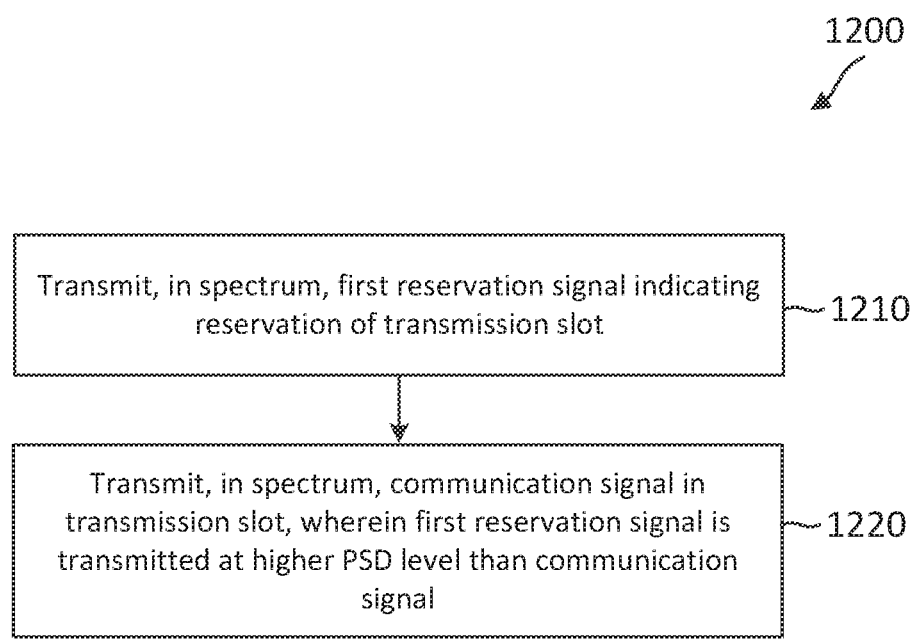
FIG. 12 is a flow diagram of a method of performing spectrum access with improved reservation signal detectability according to embodiments of the present disclosure.

FIG. 12 is a flow diagram of a method 1200 of performing spectrum access with improved reservation signal detectability according to embodiments of the present disclosure. Steps of the method 1200 can be executed by a computing device (e.g., a processor, processing circuit, and/or other suitable component) of a wireless communication device, such as the BSs 105, 205, and 600 and the UEs 115, 215, and 500. The method 1200 may employ similar mechanisms as in the schemes 700, 800, and 900 described with respect to FIGS. 7, 8, and 9, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes transmitting, in a priority-based access spectrum (e.g., a shared spectrum or a licensed spectrum), a first reservation signal (e.g., the signals 320, 322, 420, and 422) indicating a reservation of a transmission slot (e.g., the transmission slot 306). For example, the spectrum is accessed by a plurality of network nodes (e.g., the macro cell 240 and the pico cell 245) based on priorities and the wireless communication device is a pico BS (e.g., the BS 205*b*) or a pico UE (e.g., the UE 215*b*).

At step 1220, the method 1200 includes, transmitting, in the spectrum, a communication signal (e.g., the signals 324, 326, 424, and 426) in the transmission slot. The first reservation signal is transmitted at a higher PSD level than the communication signal, for example, by employing the schemes 700, 800, and/or 900.

Figure 13:
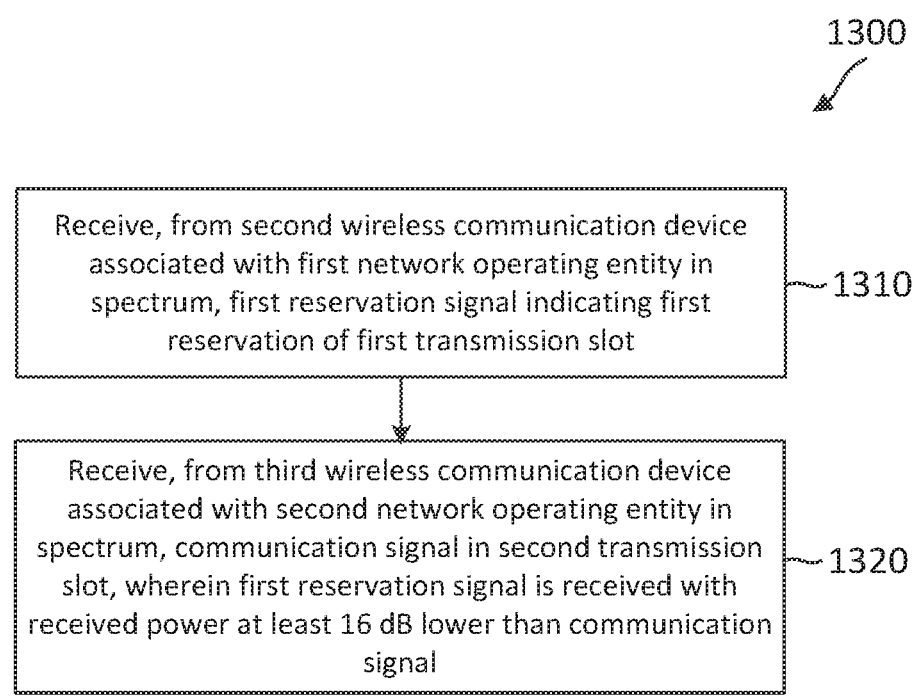
FIG. 13 is a flow diagram of a method of performing spectrum access with improved reservation signal detectability according to embodiments of the present disclosure.

FIG. 13 is a flow diagram of a method 1300 of performing spectrum access with improved reservation signal detectability according to embodiments of the present disclosure. Steps of the method 1300 can be executed by a computing device (e.g., a processor, processing circuit, and/or other suitable component) of a wireless communication device, such as the BSs 105, 205, and 600 and the UEs 115, 215, and 500. The method 1300 may employ similar mechanisms as in the scheme 1100 described with respect to FIG. 11. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes receiving, from a second wireless communication device associated with a first network operating entity (e.g., the pico cell 245) in a priority-based access spectrum (e.g., a shared spectrum or a licensed spectrum), a first reservation signal (e.g., the signals 320, 322, 420, and 422) indicating a first reservation of a first transmission slot (e.g., the transmission slot 306). For example, the spectrum is accessed by a plurality of network operating entities (e.g., the macro cell 240 and the pico cell 245) based on priorities and the wireless communication device is a macro BS (e.g., the BS 205*a*) or a macro UE (e.g., the UE 215*a*).

At step 1320, the method 1300 includes receiving, from a third wireless communication device associated with a second network operating entity (e.g., the macro cell 240), a communication signal in a second transmission slot (e.g., not reserved by a lower priority pico cell). The first reservation signal is received with a received power at about 16 dB to about 23 dB lower than the communication signal. For example, the wireless communication device is configured with an increased receiver sensitivity to improve the detectability of the reservation signal from the pico cell, for example, by employing the scheme 1100.

Figure 14:
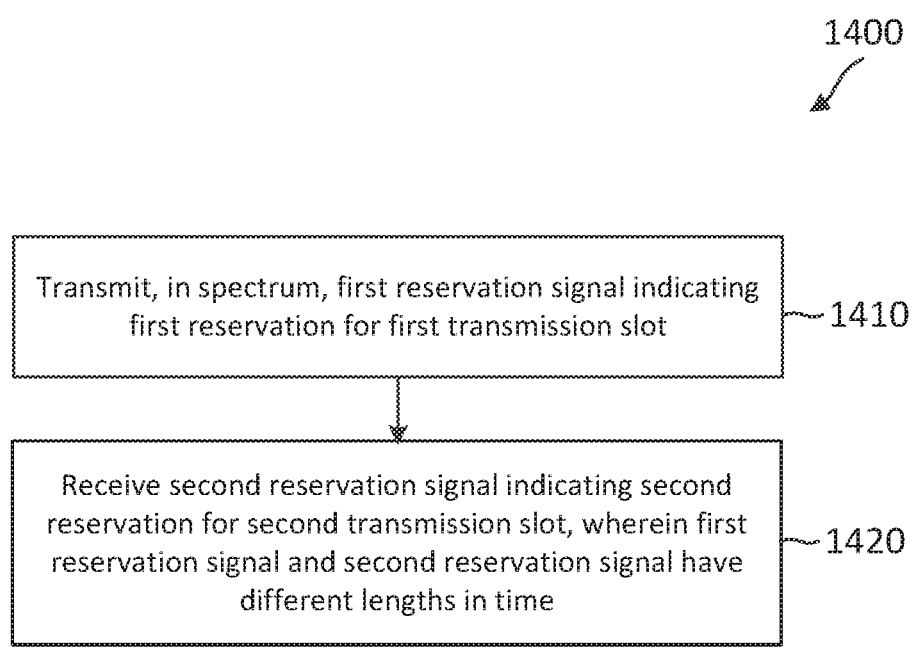
FIG. 14 is a flow diagram of a method of performing spectrum access with improved reservation signal detectability according to embodiments of the present disclosure.

FIG. 14 is a flow diagram of a method 1400 of performing spectrum access with improved reservation signal detectability according to embodiments of the present disclosure. Steps of the method 1400 can be executed by a computing device (e.g., a processor, processing circuit, and/or other suitable component) of a wireless communication device, such as the BSs 105, 205, and 600 and the UEs 115, 215, and 500. The method 1400 may employ similar mechanisms as in the scheme 1000 described with respect to FIG. 10. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes transmitting, in a priority-based access spectrum (e.g., a shared spectrum or a licensed spectrum), a first reservation signal (e.g., the signals 320, 322, 420, and 422) indicating a first reservation of a first transmission slot (e.g., the transmission slot 306). For example, the spectrum is accessed by a plurality of network operating entities (e.g., the macro cell 240 and the pico cell 245) based on priorities and the wireless communication device is a pico BS (e.g., the BS 205*b*) or a pico UE (e.g., the UE 215*b*).

At step 1420, the method 1200 includes, receiving, in the spectrum, a second reservation signal indicating a second reservation of a second transmission slot. For example, the second reservation signal is received from a macro node (e.g., the BS 205*a* or the UE 215*a*). The first reservation signal and the second reservation signal have different lengths in time. When the wireless communication device is a pico node, the first reservation signal has a longer duration than the second reservation signal. Alternatively, when the wireless communication device is a macro node, the second reservation signal has a longer duration than the first reservation signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising transmitting, by a first wireless communication device associated with a first network operating entity of a plurality of network operating entities in a spectrum accessed by the plurality of network operating entities, a first reservation signal indicating a reservation of a first transmission slot; and transmitting, by the first wireless communication device to a second wireless communication device associated with the first network operating entity in the spectrum, a first communication signal in the first transmission slot, wherein the first reservation signal is transmitted at a higher power spectral density (PSD) level than the first communication signal.

The method further includes wherein the first reservation signal and the first communication signal have a same bandwidth, and wherein the first reservation signal is transmitted at a higher total power than the first communication signal. The method further includes wherein the first reservation signal has a narrower bandwidth than the first communication signal. The method further includes wherein the first communication signal has a first plurality of consecutive active frequency tones, and wherein the first reservation signal has a second plurality of active frequency tones spaced apart by at least one inactive frequency tone. The method further includes receiving, by the first wireless communication device from a third wireless communication device, a second reservation signal indicating a reservation of a second transmission slot; and receiving, by the first wireless communication device from the third wireless communication device, a second communication signal in the second transmission slot, wherein the second reservation signal is received with a higher receive PSD level than the second communication signal. The method further includes wherein the first network operating entity is associated with a lower power class than a second network operating entity of the plurality of network operating entities.

Further embodiments of the present disclosure include a method of wireless communication, comprising transmitting, by a first wireless communication device associated with a first network operating entity of a plurality of network operating entities in a spectrum accessed by the plurality of network operating entities, a first reservation signal indicating a reservation of a first transmission slot; and receiving, by the first wireless communication device from a second wireless communication device associated with a second network operating entity of the plurality of network operating entities, a second reservation signal indicating a reservation of a second transmission slot, wherein the first reservation signal and the second reservation signal have different lengths in time.

The method further includes wherein the first network operating entity is associated with a lower power class than the second network operating entity, and wherein the first reservation signal is longer in time than the second reservation signal. The method further includes wherein the second network operating entity is associated with a lower power class than the first network operating entity, and wherein the second reservation signal is longer in time than the first reservation signal. The method further includes transmitting, by the first wireless communication device to a third wireless communication device associated with the first network operating entity, a communication signal in the first transmission slot. The method further includes receiving, by the first wireless communication device from a third wireless communication device associated with the second network operating entity, a communication signal in the second transmission slot.

Further embodiments of the present disclosure include a method of wireless communication, comprising receiving, by a first wireless communication device associated with a first network operating entity from a second wireless communication device associated with a second network operating entity in a spectrum accessed by the first network operating entity and the second network operating entity, a first reservation signal indicating a reservation of a first transmission slot; and receiving, by the first wireless communication device from a third wireless communication device associated with the first network operating entity, a communication signal in a second transmission slot, wherein the first reservation signal is received with a received power at least 16 decibel (dB) less than a received power of the communication signal.

The method further includes transmitting, by the first wireless communication device, a second reservation signal indicating a reservation of the second transmission slot. The method further includes receiving, by the first wireless communication device from the third wireless communication device, a second reservation signal indicating a reservation of the second transmission slot. The method further includes wherein the first network operating entity is associated with a higher power class than the second network operating entity.

Further embodiments of the present disclosure include an apparatus comprising a transmitter configured to transmit, in a spectrum accessed by a plurality of network operating entities, a first reservation signal indicating a reservation of a first transmission slot, wherein the apparatus is associated with a first network operating entity of the plurality of network operating entities; and transmit, to a second wireless communication device associated with the first network operating entity in the spectrum, a first communication signal in the first transmission slot, wherein the first reservation signal is transmitted at a higher power spectral density (PSD) level than the first communication signal.

The apparatus further includes wherein the first reservation signal and the first communication signal have a same bandwidth, and wherein the first reservation signal is transmitted at a higher total power than the first communication signal. The apparatus further includes wherein the first reservation signal has a narrower bandwidth than the first communication signal. The apparatus further includes wherein the first communication signal has a first plurality of consecutive active frequency tones, and wherein the first reservation signal has a second plurality of active frequency tones spaced apart by at least one inactive frequency tone. The apparatus further includes a receiver configured to receive, from a third wireless communication device, a second reservation signal indicating a reservation of a second transmission slot; and receive, from the third wireless communication device, a second communication signal in the second transmission slot, wherein the second reservation signal is received with a higher receive PSD level than the second communication signal. The apparatus further includes wherein the first network operating entity is associated with a lower power class than a second network operating entity of the plurality of network operating entities.

Further embodiments of the present disclosure include an apparatus comprising a transmitter configured to transmit, in a spectrum accessed by a plurality of network operating entities, a first reservation signal indicating a reservation of a first transmission slot, wherein the apparatus is associated with a first network operating entity of the plurality of network operating entities; and a receiver configured to receive, from a second wireless communication device associated with a second network operating entity of the plurality of network operating entities, a second reservation signal indicating a reservation of a second transmission slot, wherein the first reservation signal and the second reservation signal have different lengths in time.

The apparatus further includes wherein the first network operating entity is associated with a lower power class than the second network operating entity, and wherein the first reservation signal is longer in time than the second reservation signal. The apparatus further includes wherein the second network operating entity is associated with a lower power class than the first network operating entity, and wherein the second reservation signal is longer in time than the first reservation signal. The apparatus further includes wherein the transmitter is further configured to transmit, to a third wireless communication device associated with the first network operating entity, a communication signal in the first transmission slot. The apparatus further includes wherein the receiver is further configured to receive, from a third wireless communication device associated with the second network operating entity, a communication signal in the second transmission slot.

Further embodiments of the present disclosure include an apparatus comprising a receiver configured to receive, from a second wireless communication device in a spectrum accessed by a first network operating entity and a second network operating entity, a first reservation signal indicating a reservation of a first transmission slot, wherein the apparatus is associated with the first network operating entity, and wherein the second wireless communication device is associated with the second network operating entity; and receive, from a third wireless communication device associated with the first network operating entity, a communication signal in a second transmission slot, wherein the first reservation signal is received with a received power at least 16 decibel (dB) less than a received power of the communication signal.

The apparatus further includes a transmitter configured to transmit a second reservation signal indicating a reservation of the second transmission slot. The apparatus further includes wherein the receiver is further configured to receive, from the third wireless communication device, a second reservation signal indicating a reservation of the second transmission slot. The apparatus further includes wherein the first network operating entity is associated with a higher power class than the second network operating entity.

Further embodiments of the present disclosure include a computer-readable medium having program code recorded thereon, the program code comprising code for causing a first wireless communication device associated with a first network operating entity of a plurality of network operating entities to transmit, in a spectrum accessed by the plurality of network operating entities, a first reservation signal indicating a reservation of a first transmission slot; and code for causing the first wireless communication device to transmit, to a second wireless communication device associated with the first network operating entity in the spectrum, a first communication signal in the first transmission slot, wherein the first reservation signal is transmitted at a higher power spectral density (PSD) level than the first communication signal.

The computer-readable medium further includes wherein the first reservation signal and the first communication signal have a same bandwidth, and wherein the first reservation signal is transmitted at a higher total power than the first communication signal. The computer-readable medium further includes wherein the first reservation signal has a narrower bandwidth than the first communication signal. The computer-readable medium further includes wherein the first communication signal has a first plurality of consecutive active frequency tones, and wherein the first reservation signal has a second plurality of active frequency tones spaced apart by at least one inactive frequency tone. The computer-readable medium further includes code for causing a first wireless communication device to receive, from a third wireless communication device, a second reservation signal indicating a reservation of a second transmission slot; and code for causing a first wireless communication device to receive, from the third wireless communication device, a second communication signal in the second transmission slot, wherein the second reservation signal is received with a higher receive PSD level than the second communication signal. The computer-readable medium further includes wherein the first network operating entity is associated with a lower power class than a second network operating entity of the plurality of network operating entities.

Further embodiments of the present disclosure include a computer-readable medium having program code recorded thereon, the program code comprising code for causing a first wireless communication device associated with a first network operating entity of a plurality of network operating entities to transmit, in a spectrum accessed by the plurality of network operating entities, a first reservation signal indicating a reservation of a first transmission slot; and code for causing a first wireless communication device to receive, from a second wireless communication device associated with a second network operating entity of the plurality of network operating entities, a second reservation signal indicating a reservation of a second transmission slot, wherein the first reservation signal and the second reservation signal have different lengths in time.

The computer-readable medium further includes wherein the first network operating entity is associated with a lower power class than the second network operating entity, and wherein the first reservation signal is longer in time than the second reservation signal. The computer-readable medium further includes wherein the second network operating entity is associated with a lower power class than the first network operating entity, and wherein the second reservation signal is longer in time than the first reservation signal. The computer-readable medium further includes code for causing a first wireless communication device to transmit, to a third wireless communication device associated with the first network operating entity, a communication signal in the first transmission slot. The computer-readable medium further includes code for causing a first wireless communication device to receive, from a third wireless communication device associated with the second network operating entity, a communication signal in the second transmission slot.

Further embodiments of the present disclosure include a computer-readable medium having program code recorded thereon, the program code comprising code for causing a first wireless communication device associated with a first network operating entity to receive, from a second wireless communication device associated with a second network operating entity in a spectrum accessed by the first network operating entity and the second network operating entity, a first reservation signal indicating a reservation of a first transmission slot; and code for causing the first wireless communication device to receive, from a third wireless communication device associated with the first network operating entity, a communication signal in a second transmission slot, wherein the first reservation signal is received with a received power at least 16 decibel (dB) less than a received power of the communication signal.

The computer-readable medium further includes code for causing the first wireless communication device to transmit a second reservation signal indicating a reservation of the second transmission slot. The computer-readable medium further includes code for causing the first wireless communication device to receive, from the third wireless communication device, a second reservation signal indicating a reservation of the second transmission slot. The computer-readable medium further includes wherein the first network operating entity is associated with a higher power class than the second network operating entity.

Further embodiments of the present disclosure include an apparatus comprising means for transmitting, in a spectrum accessed by a plurality of network operating entities, a first reservation signal indicating a reservation of a first transmission slot, wherein the apparatus is associated with a first network operating entity of the plurality of network operating entities; and means for transmitting, to a second wireless communication device associated with the first network operating entity in the spectrum, a first communication signal in the first transmission slot, wherein the first reservation signal is transmitted at a higher power spectral density (PSD) level than the first communication signal.

The apparatus further includes wherein the first reservation signal and the first communication signal have a same bandwidth, and wherein the first reservation signal is transmitted at a higher total power than the first communication signal. The apparatus further includes wherein the first reservation signal has a narrower bandwidth than the first communication signal. The apparatus further includes wherein the first communication signal has a first plurality of consecutive active frequency tones, and wherein the first reservation signal has a second plurality of active frequency tones spaced apart by at least one inactive frequency tone. The apparatus further includes means for receiving, from a third wireless communication device, a second reservation signal indicating a reservation of a second transmission slot; and means for receiving, from the third wireless communication device, a second communication signal in the second transmission slot, wherein the second reservation signal is received with a higher receive PSD level than the second communication signal. The apparatus further includes wherein the first network operating entity is associated with a lower power class than a second network operating entity of the plurality of network operating entities.

Further embodiments of the present disclosure include an apparatus comprising means for transmitting, in a spectrum accessed by a plurality of network operating entities, a first reservation signal indicating a reservation of a first transmission slot, wherein the apparatus is associated with a first network operating entity of a plurality of network operating entities; and means for receiving, from a second wireless communication device associated with a second network operating entity of the plurality of network operating entities, a second reservation signal indicating a reservation of a second transmission slot, wherein the first reservation signal and the second reservation signal have different lengths in time.

The apparatus further includes wherein the first network operating entity is associated with a lower power class than the second network operating entity, and wherein the first reservation signal is longer in time than the second reservation signal. The apparatus further includes wherein the second network operating entity is associated with a lower power class than the first network operating entity, and wherein the second reservation signal is longer in time than the first reservation signal. The apparatus further includes means for transmitting, to a third wireless communication device associated with the first network operating entity, a communication signal in the first transmission slot. The apparatus further includes means for receiving, from a third wireless communication device associated with the second network operating entity, a communication signal in the second transmission slot.

Further embodiments of the present disclosure include an apparatus comprising means for receiving, from a second wireless communication device in a spectrum accessed by a first network operating entity and a second network operating entity, a first reservation signal indicating a reservation of a first transmission slot, wherein the apparatus is associated with the first network operating entity, and wherein the second wireless communication device is associated with the second network operating entity; and means for receiving, from a third wireless communication device associated with the first network operating entity, a communication signal in a second transmission slot, wherein the first reservation signal is received with a received power at least 16 decibel (dB) less than a received power of the communication signal.

The apparatus further includes means for transmitting a second reservation signal indicating a reservation of the second transmission slot. The apparatus further includes means for receiving, from the third wireless communication device, a second reservation signal indicating a reservation of the second transmission slot. The apparatus further includes wherein the first network operating entity is associated with a higher power class than the second network operating entity.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device in a spectrum accessed by a plurality of network operating entities, a reservation signal reserving a first transmission slot, wherein the first wireless communication device and the second wireless communication device are associated with a first network operating entity of the plurality of network operating entities; and
   communicating, by the first wireless communication device with the second wireless communication device, a communication signal in the first transmission slot,
   wherein the reservation signal reserving the first transmission slot includes a higher power spectral density (PSD) level and a narrower bandwidth than the communication signal communicated in the reserved first transmission slot based on the first wireless communication device being associated with the first network operating entity.

2. The method of claim 1, wherein the communication signal has a first plurality of consecutive active frequency tones, and wherein the reservation signal has a second plurality of active frequency tones spaced apart by at least one inactive frequency tone.

3. The method of claim 1, wherein the communicating the reservation signal includes transmitting, by the first wireless communication device to the second wireless communication device, the reservation signal, and wherein the communicating the communication signal incudes transmitting, by the first wireless communication device to the second wireless communication device, the communication signal.

4. The method of claim 1, wherein the communicating the reservation signal includes receiving, by the first wireless communication device from the second wireless communication device, the reservation signal, and wherein the communicating the communication signal incudes receiving, by the first wireless communication device from the second wireless communication device, the communication signal.

5. The method of claim 1, wherein the first network operating entity is associated with a lower power class than a second network operating entity of the plurality of network operating entities.

6. An apparatus comprising:
   one or more antennas; and
   a transceiver configured to:
      communicate, via the one or more antennas with a second wireless communication device in a spectrum accessed by a plurality of network operating entities, a reservation signal reserving a first transmission slot, wherein the apparatus and the second wireless communication device are associated with a first network operating entity of the plurality of network operating entities; and
      communicate, via the one or more antennas with the second wireless communication device, a communication signal in the first transmission slot,
   wherein the reservation signal reserving the first transmission slot includes a higher power spectral density (PSD) level and a narrower bandwidth than the communication signal communicated in the reserved first transmission slot based on the apparatus being associated with the first network operating entity.

7. The apparatus of claim 6, wherein the communication signal has a first plurality of consecutive active frequency tones, and wherein the reservation signal has a second plurality of active frequency tones spaced apart by at least one inactive frequency tone.

8. The apparatus of claim 6, wherein the transceiver is further configured to:
   communicate the reservation signal by transmitting, to the second wireless communication device, the reservation signal; and
   communicate the communication signal by transmitting, to the second wireless communication device, the communication signal.

9. The apparatus of claim 6, wherein the transceiver is further configured to:
   communicate the reservation signal by receiving, from the second wireless communication device, the reservation signal; and
   communicate the communication signal by receiving, from the second wireless communication device, the communication signal.

10. The apparatus of claim 6, wherein the first network operating entity is associated with a lower power class than a second network operating entity of the plurality of network operating entities.

* * * * *